Figure 1:
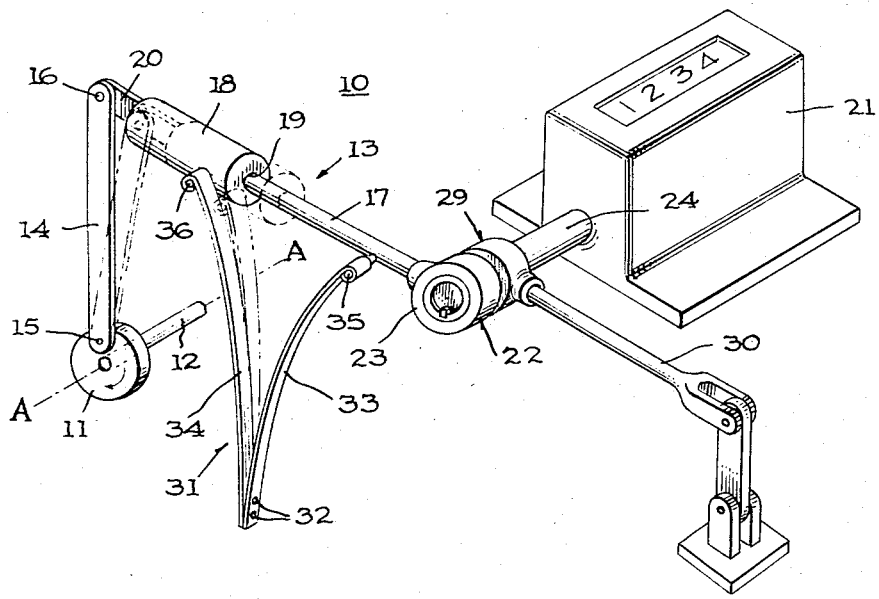

INVENTOR

WILLIS E. ROSE

BY Cameron, Kerkam & Sutton
ATTORNEYS

United States Patent Office 3,358,506
Patented Dec. 19, 1967

3,358,506
TEMPERATURE COMPENSATING DEVICE FOR
FLUID METERS
Willis E. Rose, Connersville, Ind., assignor to Dresser
Industries, Inc., Dallas, Tex., a corporation of Delaware
Filed Aug. 6, 1964, Ser. No. 387,842
8 Claims. (Cl. 73—233)

The present invention relates to compensating devices for fluid meters, and more particularly to a device for correcting the indicated volume readings of a positive displacement fluid meter so as to compensate for variations in temperature of the metered fluid.

In fluid meters of the type commonly utilized in the volumetric measurement of gaseous fluids, such as gas meters, the density of the gas, and hence its heating value per unit of volume, varies with changes in temperature of the gas. Consequently, the volume of gas passing through the meter as recorded on an indicator driven directly by the meter does not accurately indicate what the volume would measure at the standard temperature used for computing the cost of the gas used. Variations in gas density due to temperature changes thus result in under-registration of the meter at low temperatures and over-registration at high temperatures. It is therefore necessary, particularly in the case of large gas-using installations, to provide means for compensating for the effect of temperature variations.

Various temperature responsive devices have been proposed for correcting the readings of gas meters so as to compensate for variations in the temperature of the metered gas. However, in known prior art arrangements such compensation is generally accomplished by adjusting the displacement of the meter by temperature-sensitive elements while maintaining a constant ratio between the strokes of the meter to the index. This necessitates the use of complicated mechanical structures including cams, stops, variable-radius rolling mechanisms, etc., and where the displacement per revolution of the meter is changed by altering the crank throw, the component forces along the axis of the crank arm which must be sustained by the temperature-sensitive element cause it to deviate from the required amount of compensation, thus introducing further inaccuracies into the metered reading.

The primary object of the present invention is to provide a new and improved mechanical correcting device for positive displacement fluid meters which will automatically compensate for variations in temperature of the fluid being metered and cause the meter to register accurately the volume of fluid used with reference to a predetermined standard or base temperature.

Another object is to provide a compensating device of the character described which is of simple construction and which includes a temperature-sensitive element which automatically adjusts the length and stroke angle of the register driving member in accordance with variations in the temperature of the metered fluid.

A further object is to provide a reliable device for correcting the index readings of a fixed displacement gas meter which is self-contained on the meter and follows temperature variations automatically to provide an accurate measurement of the gas flow in terms of a standard volume/temperature relationship.

In accordance with the present invention, the disadvantages of the prior art structures are overcome by the provision of a structurally simple, efficient device which compensates for temperature variations in the metered fluid by varying the length and stroke angle of a crank arm which is actuated by a fixed throw eccentric mechanism driven by the meter, and which, in turn, drives the rotatable shaft of a counter index. With this construction, the component forces along the axis of the crank arm are small and can be absorbed within the adjustable length crank arm, and are not imposed on the temperature-sensitive element. The absence of mechanical forces on the thermostatic element makes its control function accurate and uninfluenced by elastic deflections from extraneous sources.

In the embodiment of the invention herein described and illustrated, the compensating device comprises a fixed stroke eccentric mechanism driven by a gas meter which oscillates a variable length crank arm drivably connected to a rotatable counter shaft by an over-running one-way clutch, the length of said crank arm being adjustable by means of a thermostatic element which is exposed to the temperature of the metered gas. When the gas changes in temperature, the temperature responsive element acts on the crank arm to increase or decrease its length, depending on the direction of change of temperature, and to thereby vary the stroke angle of the arm which in turn varies the amount of rotation of the counter shaft during each stroke.

Figure 2:
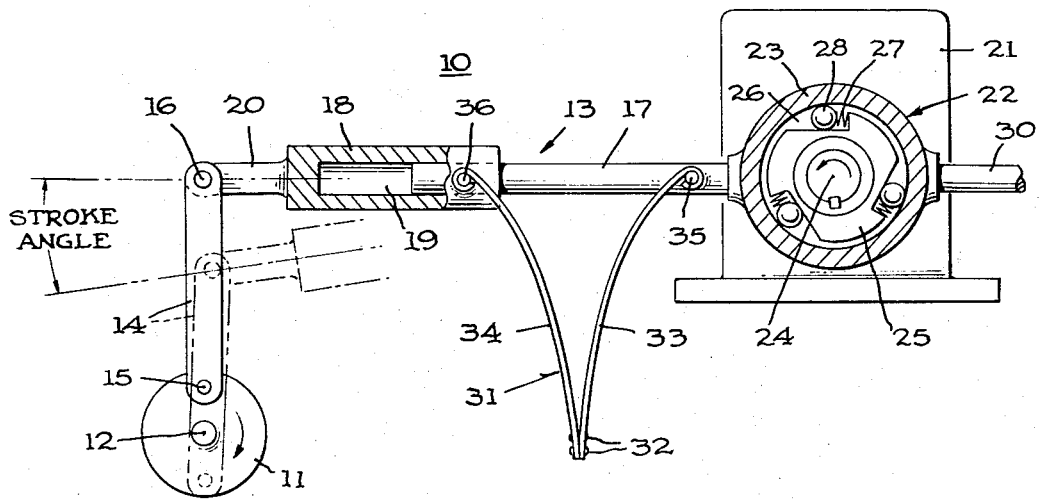

While the specification concludes with claims which particularly point out and distinctly claim the novel subject matter herein disclosed, the invention will be more fully understood from the following description taken in conjunction with the accompanying drawing in which:

FIG. 1 is a perspective view of one form of compensating device embodying the present invention, and FIG. 2 is a side view, partially in cross section, of the device of FIG. 1.

Referring now to the drawing, the numeral 10 designates generally a compensating or correcting device according to the invention which is adapted to be self-contained on a conventional gas meter of the fixed or constant displacement type (not shown). As illustrated, the device 10 includes a fixed throw eccentric mechanism comprising a disk 11, mounted on a rotatable shaft 12 and a rod 14 which is pivotally connected at its lower end to disk 11 by a pin 15 offset from the axis of shaft 12. Shaft 12 is suitably arranged to be driven by the output element of a constant displacement meter in a manner well-known in the art so that its rotational movement is a measure of the amount of gas passing through the meter. The axis of rotation A—A of the eccentric disk 11 and shaft 12 is maintained stationary so that the length of stroke of rod 14 is always the same.

For translating the rotary movement of shaft 12 and disk 11 to the drive mechanism of a register or counter 21, the upper end of eccentric rod 14 is pivotally connected by a pin 16 to the outer end of a variable-length crank arm or lever 13, the other end of which is drivably connected to the rotatable shaft 24 of the counter 21 by means of an overriding one-way clutch 22 hereinafter described in detail. With this construction, lever 13 is oscillated in a vertical plane about the axis of counter shaft 24 by rod 14 in response to rotation of the disk 11. As indicated by the legend in FIG. 1, the angle through which lever 13 is oscillated is called its "stroke angle."

Lever 13 is so constructed that its length may be varied thermostatically in accordance with variations in the temperature of the metered gas. Varying the effective length of lever 13 in turn varies its stroke angle and thereby changes the ratio between the number of revolutions of the meter driven shaft 12 and those of the counter shaft 24 to compensate for variations in the temperature of the metered gas from a standard or base temperature. In the embodiment illustrated, the lever 13 comprises a rod member 17 of circular cross-section and a cylindrical sleeve 18 having an axial bore 19 into which one end of rod 17 extends so that the rod and sleeve are maintained in telescopic engagement. The outer end of sleeve 18 is closed and has fixed thereto a connecting member 20 which is pivotally connected to eccentric rod 14 by means of the pin 16. It will be obvious, of course, that the lever 13 may be constructed in various other ways so as to permit variation in the effective length thereof.

As shown, the length of lever 13 may be varied by means of a temperature-sensitive element 31 comprising a pair of bimetallic arms 33 and 34 which are connected at their lower ends by pins or rivets 32 and diverge upwardly to provide a substantially V-shaped member the upper ends of which are fixed, respectively, to a pin 35 on rod 17 and a pin 36 on sleeve 18. In order that the bimetallic element 31 may respond to changes in temperature of the metered gas, it is so located as to be directly exposed to the stream of gas passing through the meter.

In order to actuate the meter register or counter 21, the end of rod 17 remote from sleeve 18 is provided with a suitable over-riding one-way clutch 22 which is drivably associated with counter shaft 24. As shown best in FIG. 2, clutch 22 includes a housing 23 surrounding the shaft 24 and a cam 25 which is keyed or otherwise fixed to said shaft. The cam 25 is provided with a plurality of peripherally spaced, angularly indented recesses 26 wherein are housed rollers 28 which are yieldably urged outwardly against the inner surface of housing 23 by springs 27. This type of over-riding clutch is well-known in the art and is commercially available from The Taylor and Helander Manufacturing Company, of Clinton, Conn.

It will be apparent from FIG. 2 that, as the lever 13 is oscillated by the eccentric disk 11 and rod 14, each downward stroke thereof will cause the clutch 22 to turn the counter shaft 24 through part of a revolution in a counterclockwise direction. During each upward stroke, the clutch releases the shaft 24 as the rollers 28 move back into the deeper ends of recesses 26 against the pressure of springs 27. However, in order to prevent any clockwise rotation of the counter shaft, an over-riding clutch brake 29 is also mounted on the shaft and suitably supported by a linkage 30. The brake 29 is of the same basic construction as clutch 22, but is so mounted as to lock shaft 24 against clockwise rotation while permitting it to rotate freely in a counterclockwise direction.

The elements of the mechanism which translate rotation of the meter driven shaft 12 into rotation of the counter shaft 24, including the temperature-sensitive means for varying the length of lever 13, are so proportioned and designed that, when the metered gas is at the established base or standard temperature, the counter 21 accurately registers the volume of gas passing through the meter. However, when the temperature of the metered gas varies from the base temperature, the bimetallic element 31 operates either to increase the effective length of lever 13 when the gas temperature increases with respect to the base temperature by moving the sleeve 18 outwardly relative to rod 17, or to shorten the lever length when the temperature decreases from the base temperature. An increase in length of lever 13 acts to decrease the stroke angle of the lever, while shortening of the lever increases the stroke angle, the result being to vary the ratio between the rotational movements of meter driven shaft 12 and counter shaft 24 so as to compensate for the variations in temperature of the metered gas.

The temperature-responsive element 31 is so arranged that the forces applied thereby to the rod 17 and sleeve 18 are exerted along the common horizontal axis thereof, while rotation of the shaft 12 is translated to the counter driving mechanism by forces which act on the lever 13 in a vertical plane. The main forces required to drive the counting mechanism thus do not affect the position of the bimetallic element 31 because the forces and bending moments are absorbed within the lever 13 and not through the thermostatic element. The thermostatic element is able to accurately adjust the length of the lever at the ends of the stroke because at these points, where the direction of forces is reversed and the forces are momentarily zero, the element 31 need overcome only very small frictional forces and is subject to very small mechanical stresses.

Although only one particular embodiment of the invention has been described and illustrated herein, it will be obvious to those skilled in the art that the inventive concept is capable of a variety of mechanical modifications. It is therefore intended by the appended claims to cover all such modifications which fall within the true scope of the invention.

What is claimed is:

1. A temperature compensating device for fluid meters of the fixed displacement type comprising, in combination with a rotatable index counter having an operating shaft, a fixed throw eccentric mechanism adapted to be driven by the meter, a link arm operatively connected at one end to said eccentric mechanism, a variable length lever mounted at one end on the counter operating shaft for oscillatory movement about the axis of said shaft, said lever having its other end pivotally connected to the other end of said link arm for oscillation thereby through a stroke of constant length, an over-riding one-way clutch interposed between said one end of said lever and said counter operating shaft whereby oscillation of said lever intermittently rotates said operating shaft in one direction only, and temperature-responsive means exposed to the temperature of the metered gas for varying the length of said lever and thereby varying the angular extent of the oscillation thereof in response to variations in the temperature of the metered fluid.

2. A temperature compensating device for fluid meters as defined in claim 1 including an over-riding one-way clutch brake for preventing rotation of the counter operating shaft in a direction opposite that in which it is rotated by said lever.

3. A temperature compensating device for fluid meters as defined in claim 1 wherein said link arm and said variable length lever are disposed generally at right angles to each other.

4. A temperature compensating device for fluid meters of the fixed displacement type comprising, in combination with a rotatable index counter having an operating shaft, a fixed throw eccentric mechanism adapted to be driven by the meter, a lever mounted at one end on the counter operating shaft for oscillatory movement about the axis of said shaft, said lever having its other end operably connected to said eccentric mechanism for oscillation thereby through a stroke of constant length, and over-riding one-way clutch interposed between said one end of said lever and said counter operating shaft whereby oscillation of said lever intermittently rotates said operating shaft in one direction only, said lever comprising a pair of telescopically associated members capable of relative longitudinal movement with respect to one another, one of said members carrying said clutch and the other of said members being connected to said eccentric mechanism, and temperature responsive means exposed to the temperature of the metered gas for varying the length of said lever and thereby varying the angular extent of the stroke thereof in response to variations in the temperature of the metered fluid, said temperature responsive means interconnecting said two members of said lever and being operable to effect relative longitudinal movement therebetween upon variations in the temperature of the metered fluid.

5. A device for correcting the reading of a fluid meter to compensate for variations in temperature of the metered fluid comprising, in combination with a meter of the fixed displacement type and a rotatable index counter, a fixed throw eccentric mechanism driven by the meter, a variable-length lever drivably connected at one end to the counter, a link arm having one end pivotally connected to the other end of said lever arm and having its other end operatively connected to said eccentric mechanism for oscillation of said lever, and means responsive to variations in the temperature of the metered fluid for varying the length of said lever and thereby the angle of oscillation of said lever.

6. A temperature compensating device for fluid meters as defined in claim 1 wherein said variable-length lever arm comprises two members moveable rectilinearly relative to one another, and said temperature responsive means comprises a thermostatic element connecting said two members and operable to produce relative movement therebetween upon variations in the temperature of the metered fluid.

7. A device for correcting the reading of a fluid meter to compensate for variations in temperature of the meter fluid comprising, in combination with a meter of the fixed displacement type and a rotatable index counter, a fixed throw eccentric mechanism driven by the meter, a variable-length lever drivingly connected at one end to the counter and having its other end connected to said eccentric mechanism for oscillation thereby through a stroke of constant length, said variable-length lever comprising two members movable rectilinearly relative to one another, and means responsive to variations in the temperature of the metered fluid for varying the length of said lever including a pair of bimetallic arms fixed to one another at one end and diverging toward their opposite ends to form a V-shaped element, said opposite ends of said bimetallic arms being connected respectively to said two members comprising said lever.

8. A device for correcting the reading of a gas meter to compensate for variations in temperature of the metered gas comprising, in combination with a meter of the fixed displacement type having a rotatable shaft adapted to drive the operating shaft of a rotatable index counter, a fixed throw eccentric mechanism including a disk driven by the meter shaft and a vertically extending rod eccentrically connected at its lower end to said disk, a variable-length lever having an over-riding one-way clutch at one end thereof which is drivably associated with the counter operating shaft, the other end of said lever being connected to the rod of said eccentric mechanism for oscillation thereby in a vertical plane, said lever including two members longitudinally movable with respect to one another so as to vary the effective length of said lever, and a vertically disposed V-shaped bimetallic member having its upper separated ends connected respectively to said two lever members, said bimetallic member being exposed to the temperature of the metered gas, whereby said member is operative to effect relative longitudinal movement between said two lever members in response to variations in the temperature of the metered gas.

References Cited

UNITED STATES PATENTS

| | | | |
|---|---|---|---|
| 2,088,270 | 7/1937 | McCandless | 73—233 |
| 2,162,375 | 6/1939 | Chrisman | 73—233 |
| 2,860,374 | 9/1957 | Granberg | 73—233 |
| 3,169,399 | 2/1965 | Allport et al. | 73—233 |
| 3,224,273 | 12/1965 | Granberg | 73—233 |
| 3,266,310 | 8/1966 | Ruffer | 73—233 |

FOREIGN PATENTS

| | | |
|---|---|---|
| 714,900 | 9/1954 | Great Britain. |

RICHARD C. QUEISSER, *Primary Examiner.*

E. D. GILHOOLY, *Assistant Examiner.*